UNITED STATES PATENT OFFICE.

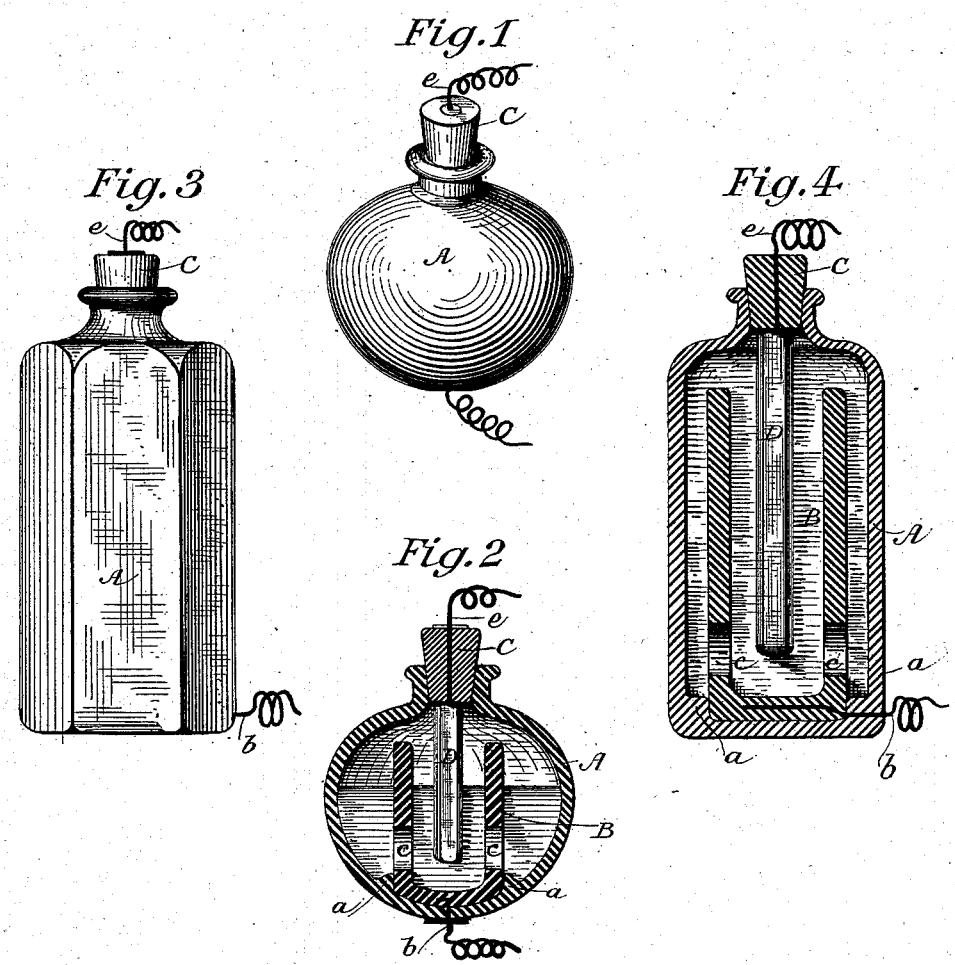

WILLIAM T. McGINNIS, OF NEW YORK, N. Y., ASSIGNOR TO JAMES H. SHAW, OF SAME PLACE.

SEALED GALVANIC-BATTERY CELL.

SPECIFICATION forming part of Letters Patent No. 295,574, dated March 25, 1884.

Application filed August 27, 1883. (No model.)

*To all whom it may concern:*

Be it known that I, WILLIAM T. McGINNIS, a citizen of the United States, and a resident of the city, county, and State of New York, have invented certain new and useful Improvements in Sealed Galvanic-Battery Cells; and I do hereby declare that the following is a full and exact description thereof, reference being had to the accompanying drawings, and to the letters of reference marked thereon, making a part of this specification.

The object of my invention is to obviate the difficulties heretofore attending the closing or sealing of portable-battery cells, and to provide a simple, compact, well-sealed, portable-battery cell, which will occupy but little space, will be free from leakage, will not be easily broken, may be readily cleansed and refilled, and which will be specially adapted for use in combination with an induction-coil and rheotome to be inclosed within exercising, gymnastic, or hand appliances, such as dumb-bells, Indian-clubs, &c., as set forth in my Letters Patent No. 281,097, of July 10, 1883.

My invention consists, mainly, in the combination, with a bottle-shaped cell, preferably made of vulcanized rubber, glass, celluloid, or other non-conducting material, within which is inclosed and secured a cup or cylinder of carbon or other electro-negative substance, of a soft-rubber stopper adapted to be forced into the contracted mouth or neck of the bottle, from the inner end of which is suspended a zinc rod securely connected thereto and to a conducting-wire led out through the stopper, the carbon plate being connected with a separate conducting-wire led out through the wall of the cell.

In the accompanying drawings, Figure 1 is a perspective view of a globular-shaped battery-cell constructed according to my invention; Fig. 2, a central section through the same; Fig. 3, a view in elevation of an elongated hexagonal-shaped cell embodying my invention, and Fig. 4 a central sectional elevation of Fig. 3.

The cell A is preferably made of hard rubber or glass, and a carbon cup, B, is inclosed therein in the process of its manufacture, the bottom of the cup being seated in the bottom of the inclosing-cell, within a recess, or between encircling offsets $a\ a$, serving to retain it firmly in place. It is still further secured by means of a platina wire, $b$, embedded in the carbon, and which is led out therefrom through the bottom or side of the cell, to serve as the negative pole of the battery. The sides of the carbon cup are preferably pierced with one or more apertures, $c\ c$, to permit a free circulation of the exciting-fluid within the cell. I contemplate substituting for the carbon in cup form, as an equivalent therefor, any other suitable electro-negative element; and it may be cylindrical, polygonal, or of such other shape as will present the largest possible surface to the exciting-fluid, and yet leave sufficient space for the introduction into the cell of an electro-positive element. The mouth of the bottle is contracted to receive a comparatively small stopper, and is securely closed, to prevent the slightest leakage of the battery-fluid, by means of a close-fitting plug or stopper, C, of elastic insulating material, preferably of soft rubber, which may be tightly compressed therein, and which, being of a non-corrosive and non-conducting character, is always clean, may be readily removed, and is free from electrical influences. To the inner end of the stopper is firmly secured the electro-positive element D of the battery, in the form of an extended rod, preferably of zinc, which is so attached as to project longitudinally from the stopper in line with its axis. A platina wire, $e$, connected to the zinc rod, is led therefrom out through the stopper, to serve as the positive pole of the battery.

Where the exciting-fluid and the elements used in the cell are not of a character to produce a permanent constant battery, the stopper with the positive element may be readily withdrawn and transferred to an empty vial when the battery is not in use, the ordinary stopper of the vial being in such case transferred to the cell to seal it.

The globular form of bottle shown in Figs. 1 and 2 is peculiarly adapted for inclosure within my improved electro-magnetic dumb-bells and clubs, and the elongated bottle is well suited to be carried in the pocket for general purposes.

I do not claim, broadly, a portable-battery cell constructed with one of its elements secured to and within the inclosing-vessel, and the other to a detachable cup or cover; but

I claim as my invention and desire to secure by Letters Patent—

The combination, in a galvanic battery, with a bottle-shaped vessel formed with a single contracted opening, and within which one of the battery-elements is inclosed and secured in the process of manufacture, of an elastic plug or stopper of insulating material adapted to be forced into the contracted opening, and to carry and suspend within the vessel the remaining element, substantially in the manner and for the purpose herein set forth.

In testimony whereof I have signed my name to this specification in the presence of two subscribing witnesses.

WILLIAM T. McGINNIS.

Witnesses:
 WM. H. ROWE,
 A. B. MOORE.